Nov. 12, 1968   J. M. SCHWARTZ   3,410,631
ZOOM TYPE OPTICAL SYSTEM FOR MAGNIFIER
Filed April 19, 1965
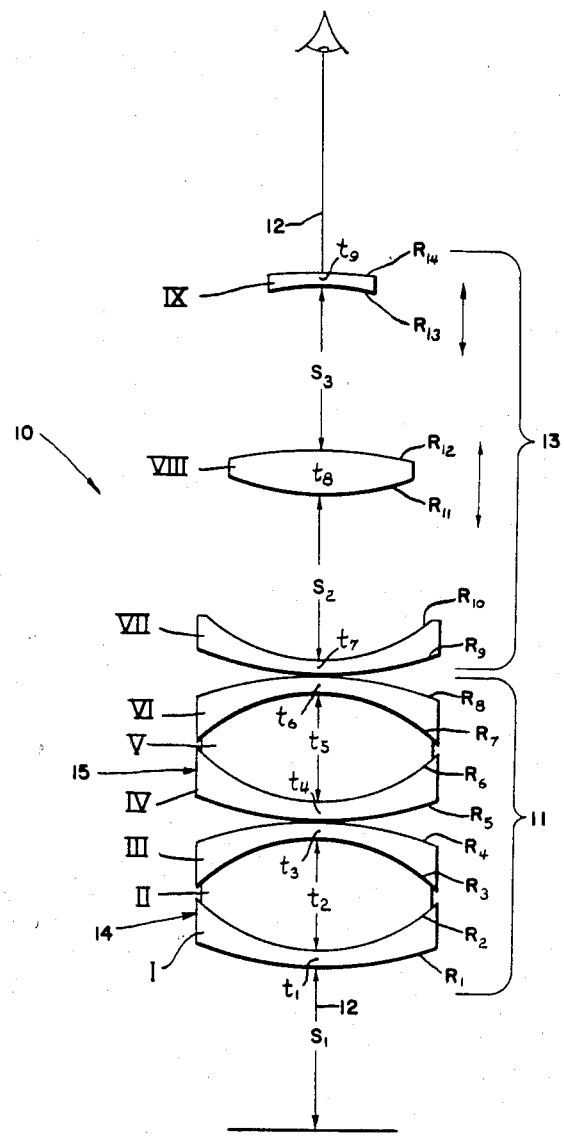
JOHN M. SCHWARTZ
INVENTOR
BY Frank C. Parker
ATTORNEY United States Patent Office 3,410,631
Patented Nov. 12, 1968

3,410,631
ZOOM TYPE OPTICAL SYSTEM
FOR MAGNIFIER
John M. Schwartz, Irondequoit, N.Y., assignor to Bausch & Lomb Incorporated, Rochester, N.Y., a corporation of New York
Filed Apr. 19, 1965, Ser. No. 449,101
1 Claim. (Cl. 350—184)

ABSTRACT OF THE DISCLOSURE

A lens system for a magnifier, the system being of the variable magnification type and including a pair of Hastings type magnifying lenses in optical alignment with an afocal variable magnification three member lens system, two members of which are movable relative to a fixed axial point in a prescribed manner to vary the magnification of the image.

---

The present invention relates to an optical system for a magnifier and more particularly it relates to improvements in a zoom type of optical system therefor.

The principal optical problem in designing a variable focal length optical system of the zoom or continuous type is the maintenance of a good state of correction of image aberrations in all parts of the range of magnification. Among the most troublesome of aberrations to reduce or eliminate are astigmatism and distortion, partly because of length limitations.

It is an object of the present invention to provide a novel zoom type of optical system which has a magnification range or ratio of high to low magnification values of at least 2.4, said system being characterized by a comparatively short length and a good state of correction of image aberrations including chromatic aberrations, astigmatism and distortion in addition to a long working distance.

Further objects and advantages will be found in the form and arrangement of the parts of the optical system and in the details of construction thereof, reference being had for a complete disclosure to the following specification and accompanying drawing wherein the single figure is an optical diagram showing a successful form of the invention.

The optical system generally is designated in the drawing by numeral 10 and said system is made up of an objective lens group 11 which is aligned with an afocal zoom lens system 13 on an optical axis 12.

According to the present invention, the form and arrangement of the component optical parts of the magnifier are carefully chosen from computation and experimental data to achieve a range of magnification ratio of at least 2.4 due to the zoom lens system per se and a satisfactory fixed magnification due to the objective lens per se while maintaining for the entire optical system throughout the entire magnification range a good state of correction of image aberrations as aforesaid. Along with a good astigmatic, achromatic and distortion condition of the image, a long working distance and large field is achieved by constructional forms and data given herebelow.

In the objective section 11 are provided two substantially duplicate Hastings type triplets numbered 14 and 15 aligned in contact with each other on the axis 12 and spaced away from an object plane 16 by a fixed distance designated $S_1$. A Hastings Triplet or alternatively a Hastings Triplet Aplanat is a cemented triplet lens consisting of a double convex lens element formed of crown glass located between two negative meniscus lens elements formed of flint glass as defined in the book entitled Principles of Optics by Hardy and Perrin, 1st edition, McGraw-Hill Book Company. Although the triplet lenses 14 and 15 for the particular working distance intended have a combined focal length represented by $F/1.8$ which produces a magnification of substantially 11 power, other focal lengths $F$ for the individual lenses 14 or 15 may be used for different fixed magnifications of the objective group 11.

Structurally each triplet lens 14 or 15 is composed of a double convex crown glass lens element which is cemented between two duplicate negative meniscus flint glass lens elements. The designations for the successive lens elements in the first and second Hastings triplets numbering from the object side are I to VI and the successive axial thicknesses of said elements are designated $t_1$ to $t_6$. Additionally, the designations for the successive lens surfaces of the lens elements I to VI are $R_1$ to $-R_8$ wherein the minus (—) sign denotes that the lens surface is concave toward the object side of the optical system 10.

As aforesaid, in contact rearwardly with the triplet lens 15 is the front member of the afocal zoom lens system 13. System 13 works in parallel light produced by the objective group 11 and said system consists of a front and rear negative meniscus lens member designated VII and IX respectively which are concave toward each other. Between lens members VII and IX is positioned a double convex positive lens designated VIII.

For varying the focal length of the afocal zoom lens system 13, the positive lens VIII and negative lens IX are both moved simultaneously with suitable relative motions such that the magnification of the image is varied through a magnification range ratio of at least 2.4 while maintaining the image in a substantially fixed axial position. During motion of lens members VIII and IX, the front and rear variable air spaces change in length as shown hereinafter, said front and rear air spaces being designated $S_2$ and $S_3$ respectively. For cost reduction purposes, it is preferred that lenses VII to IX be singlet in form and the focal lengths of the respective members are designated $-F_{VII}$ to $-F_{IX}$ wherein the minus (—) sign denotes negative focal length.

The axial thicknesses of the lens members VII to IX are designated $t_7$ to $t_9$ and the radii of the successive lens surfaces thereof are designated $R_9$ to $-R_{14}$.

The constructional data for the optical system 10 is given in the following Table I of mathematical statements for the values of focal lengths $-F_{VII}$ to $-F_{IX}$ in terms of $F$ which is the equivalent focal length for either of the triplet objective lenses 14 or 15, it being understood that the individual focal length of lenses 14 and 15 may be changed to obtain a different working distance $S_1$ and magnification for the magnifier, for the spaces $S_1$, $S_2$ and $S_3$, and lens thicknesses $t_1$ to $t_9$, and for the lens radii $R_1$ to $-R_{14}$.

TABLE I $.73F < -F_{VII} < .80F$
$.56F < F_{VIII} < .60F$
$.73F < -F_{IX} < .80F$
$.743F < R_1 < .929F$
$.341F < R_2 < .417F$
$.341F < -R_3 < .417F$
$.743F < -R_4 < .929F$
$.743F < R_5 < .929F$
$.341F < R_6 < .417F$
$.341F < -R_7 < .417F$
$.743F < -R_8 < .929F$
$1.174F < R_9 < 1.434F$
$.306F < R_{10} < .372F$
$.501F < R_{11} < .655F$
$.796F < -R_{12} < .972F$
$.348F < -R_{13} < .424F$
$1.910F < -R_{14} < 2.334F$
$.0311F < t_1 < .0379F$

TABLE I.—Continued $.2056F < t_2 < .2634F$
$.0311F < t_3 < .0379F$
$.0311F < t_4 < .0379F$
$.2056F < t_5 < .2634F$
$.0311F < t_6 < .0379F$
$.0415F < t_7 < .0507F$
$.0909F < t_8 < .1111F$
$.0228F < t_9 < .0278F$ Table II gives the values of the variable air spaces $S_2$ and $S_3$ in terms of F for a plurality of image magnifications within the magnification range.

TABLE II

| Magnification | $S_2$ | $S_3$ |
|---|---|---|
| 1.62× | .726 F | .152 F |
| 1.43× | .616 F | .199 F |
| 1.00× | .362 F | .376 F |
| .68× | .169 F | .662 F |
| .61× | .136 F | .743 F |

For an objective lens group 11 as specified by the above constructional data, the working distance or front air space $S_1$ has a value as stated in the mathematical statement herebelow.

$$.2994F < S_1 < .3660F$$

Further specifications for the optical system 10 concern the refractive index $n_D$ and Abbe number $\nu$ of the glass from which the various lens elements I to IX are made and the absolute values thereof are given in Table III herebelow wherein $n_D(I)$ to $n_D(IX)$ represent the refractive index of the successive aforesaid lens elements and $\nu(I)$ to $\nu(IX)$ represent the Abbe numbers for the same elements.

TABLE III $1.575 < n_D(I) < 1.585$
$1.512 < n_D(II) < 1.522$
$1.575 < n_D(III) < 1.585$
$1.575 < n_D(IV) < 1.585$
$1.512 < n_D(V) < 1.522$
$1.575 < n_D(VI) < 1.585$
$1.612 < n_D(VII) < 1.622$
$1.612 < n_D(VII) < 1.622$
$1.612 < n_D(IX) < 1.622$
$36.0 < \nu(I) < 46.0$
$60.0 < \nu(II) < 70.0$
$36.0 < \nu(III) < 46.0$
$36.0 < \nu(IV) < 46.0$
$60.0 < \nu(V) < 70.0$
$36.0 < \nu(VI) < 46.0$
$32.0 < \nu(VII) < 42.0$
$49.0 < \nu(VIII) < 59.0$
$32.0 < \nu(IX) < 42.0$

The values for the constructional data for one successful form of the optical system 10 with regard to the foregoing specification is given in Table IV herebelow wherein the designations remain the same as heretofore.

TABLE IV $R_1 = .836F$
$R_2 = .379F$
$-R_3 = .379F$
$-R_4 = .836F$
$R_5 = .836F$
$R_6 = .379F$
$-R_7 = .379F$
$-R_8 = .836F$
$R_9 = 1.304F$
$R_{10} = .339F$
$R_{11} = .578F$
$-R_{12} = .884F$
$-R_{13} = .386F$
$-R_{14} = 2.122F$
$S_1 = .3327F$
$S_2 = .726F$ at 1.62×
$S_2 = .616F$ at 1.43×
$S_2 = .362F$ at 1.00×
$S_2 = .169F$ at .68×
$S_2 = .136F$ at .61×
$S_3 = .152F$ at 1.62×
$S_3 = .199F$ at 1.43×
$S_3 = .376F$ at 1.00×
$S_3 = .662F$ at .68×
$S_3 = .743F$ at .61×
$t_1 = .0345F$
$t_2 = .2395F$
$t_3 = .0345F$
$t_4 = .0345F$
$t_5 = .2395F$
$t_6 = .0345F$
$t_7 = .0461F$
$t_8 = .1010F$
$t_9 = .0253F$ $n_D(I) = n_D(III) = n_D(IV) = n_D(VI) = 1.580$
$n_D(II) = n_D(V) = 1.512$
$n_D(VII) = n_D(VIII) = n_D(IX) = 1.617$
$\nu(I) = \nu(III) = \nu(IV) = \nu(VI) = 41.0$
$\nu(II) = \nu(V) = 64.5$
$\nu(VII) = \nu(IX) = 36.6$
$\nu(VIII) = 53.9$

The afocal zoom lens system 13 per se operates at image magnifications lying between .61× and 1.62× as constructed from the data given in Table IV and the eye of the observer is located in collimated image rays at an axial distance of substantially 10 mm. known as the eye relief of the magnifier.

It will be observed that there is disclosed in the foregoing statements a zoom magnifier having a particular construction to most completely satisfy the stated objects of the present invention and although only a single form of optical system has been shown and described in detail, other forms are possible and changes may be made in the constructional details within the limits specified without departing from the spirit of the invention as defined in the appended claims.

I claim:
1. A variable focal length type of optical system for a magnifier comprising
   a first Hastings type triplet lens having four successive refractive surfaces the radii thereof being designated $R_1$ to $-R_4$, wherein the minus sign designates a lens surface curvature which is concave toward the object plane, the axial thicknesses of its successive three lens elements (I–III) being designated $t_1$ to $t_3$,
   a second Hastings type triplet lens in contact with said first triplet lens and having four successive refractive surfaces having radii which are designated $R_5$ to $-R_8$, the axial thicknesses of its successive three lens elements (IV–VI) being designated $t_4$ to $t_6$,
   said system further comprising an optically aligned afocal variable focal length lens system having two negative meniscus lens members which are concave toward each other and an interposed double convex lens member, the front negative lens member being in contact with the second triplet lens member,
   said double convex lens member and said rear negative lens member being moved axially differentially to vary the magnification of the image formed by said system,
   the radii of the successive lens surfaces of the variable focal length lens members being designated $R_9$ to $-R_{14}$ and the axial thicknesses of the three zoom lens members (VII–IX) being designated successively $t_7$ to $t_9$,
   the front axial air space between said object plane and first Hastings lens member being designated $S_1$ and the front and rear variable air spaces in the variable focal length system being designated $S_2$ and $S_3$, the specific values of the radii $R_1$ to $-R_{14}$, the air spaces $S_1$ to $S_3$, and lens thicknesses $t_1$ to $t_9$ being substantially as stated in the table herebelow, $R_1 = .836F$
$R_2 = .379F$
$-R_3 = .379F$
$-R_4 = .836F$
$R_5 = .836F$
$R_6 = .379F$
$-R_7 = .379F$
$-R_8 = .836F$
$R_9 = 1.304F$
$R_{10} = .339F$
$R_{11} = .578F$
$-R_{12} = .884F$
$-R_{13} = .386F$
$-R_{14} = 2.122F$
$t_1 = .0345F$
$t_2 = .2395F$
$t_3 = .0345F$
$t_4 = .0345F$
$t_5 = .2395F$
$t_6 = .0345F$
$t_7 = .461F$
$t_8 = .1010F$
$t_9 = .0253F$
$S_1 = .3327F$

| Magnification | $S_2$ | $S_3$ |
|---|---|---|
| 1.62× | .726 F | .152 F |
| 1.43× | .616 F | .199 F |
| 1.00× | .362 F | .376 F |
| .68× | .169 F | .662 F |
| .61× | .136 F | .743 F | the specific absolute values for refractive index and Abbe number for all of the lens elements I to IX therein which are designated respectively $n_D(I)$ to $n_D(IX)$ and $\nu(I)$ to $\nu(IX)$ being substantially given in the supplemental table herebelow, $n_D(I) = n_D(III) = n_D(IV) = n_D(VI) = 1.580$
$n_D(II) = n_D(V) = 1.512$
$n_D(VII) = n_D(VIII) = n_D(IX) = 1.617$
$\nu(I) = \nu(III) = \nu(IV) = \nu(VI) = 41.0$
$\nu(II) = \nu(V) = 64.5$
$\nu(VII) = \nu(IX) = 36.6$
$\nu(VIII) = 53.9$

References Cited

UNITED STATES PATENTS

| | | | |
|---|---|---|---|
| 886,416 | 5/1908 | Rudolph | 350—234 |
| 2,165,341 | 7/1939 | Capstaff et al. | 350—184 |

DAVID SCHONBERG, *Primary Examiner.*

R. J. STERN, *Assistant Examiner.*

UNITED STATES PATENT OFFICE
CERTIFICATE OF CORRECTION

Patent No. 3,410,631                                               November 12, 1968

John M. Schwartz

It is certified that error appears in the above identified patent and that said Letters Patent are hereby corrected as shown below:

Column 5, line 24, "$t_7 = .461$ F" should read -- $t_7 = .0461$ F --.

Signed and sealed this 24th day of March 1970.

(SEAL)
Attest:

Edward M. Fletcher, Jr.                          WILLIAM E. SCHUYLER, JR.
Attesting Officer                                                 Commissioner of Patents